United States Patent [19]
Takeshita et al.

[11] Patent Number: 5,313,447
[45] Date of Patent: May 17, 1994

[54] OPTICAL HEAD

[75] Inventors: Nobuo Takeshita; Kenjiro Kime; Teruo Fujita, all of Nagaokakyo; Hiroo Shimegi; Kazuo Okada, both of Amagasaki, all of Japan

[73] Assignee: Mitsubishi Denki Kabushiki Kaisha, Tokyo, Japan

[21] Appl. No.: 77,969

[22] Filed: Jun. 18, 1993

Related U.S. Application Data

[63] Continuation of Ser. No. 686,440, Apr. 17, 1991, abandoned.

[30] Foreign Application Priority Data

Apr. 28, 1990 [JP] Japan .................. 2-114806

[51] Int. Cl.⁵ .............................. G11B 7/135
[52] U.S. Cl. ...................... 369/112; 369/119
[58] Field of Search ............ 369/112, 119, 100

[56] References Cited

U.S. PATENT DOCUMENTS

| | | | |
|---|---|---|---|
| 4,142,098 | 2/1979 | Korpel | 369/112 |
| 4,730,899 | 3/1988 | Kime et al. | 369/100 |
| 4,926,409 | 5/1990 | Tsuyuguchi et al. | 369/112 |
| 5,072,436 | 12/1991 | Honda | 369/112 |

FOREIGN PATENT DOCUMENTS

| | | | |
|---|---|---|---|
| 0176271 | 4/1986 | European Pat. Off. | 369/12 |
| 60-45950 | 3/1985 | Japan . | |

OTHER PUBLICATIONS

"Compact Magnetooptical Disk For Coded Data Storage" Applied Optics vol. 25, No. 4, pp. 483–489.

Primary Examiner—Constantine Hannaher
Assistant Examiner—Drew A. Dunn

[57] ABSTRACT

An optical head for recording, reproducing or erasing data by emitting a light beam irradiated from a light source onto a recording medium. To reduce the height of the optical head, an optical axis shifting device is disposed between a light beam emitting device and a condensing device for condensing the light beam onto the recording medium. This optical axis shifting device shifts the first optical axis of the light beam from the light beam emitting device to a second optical axis positioned in parallel and spaced apart from each other. As the optical axis shifting device, there is preferable employed a prism having two reflecting faces lying in parallel, and the optical axis, after shifting is to be positioned downwardly of the position of the optical axis before shifting, thereby reducing the height of the optical head.

14 Claims, 5 Drawing Sheets

OPTICAL HEAD

This application is a continuation-in-part, of application Ser. No. 07/686,440 filed on Apr. 17, 1991, which is now abandoned.

BACKGROUND OF THE INVENTION

1. Field of the Invention

This invention relates to an optical disk apparatus for optically reading data from a disk of a recording medium and, more particularly, to an optical head comprising an optical system including a light source and a photodetector for detecting a light reflected from the disk.

2. Description of the Related Art

FIG. 7 through FIG. 9 of the accompanying drawings illustrate a structure of a conventional optical head. FIG. 7 is a schematic view showing a structure of the optical head employed in the optical disk apparatus shown in FIG. 7; FIG. 8, a sectional side elevation view of a light beam emitting device used in the optical head; and FIG. 9, a layout drawing showing optical components of the beam emitting device.

In the drawings, reference numeral 1 designates a disk as a recording medium; 2, a disk motor; 3, an optical base; 4, an objective lens drive unit; 5, an objective lens; 6, a reflecting mirror disposed at a part of the drive unit 4 and for guiding a light beam 9 emitted from a light beam emitting device 50 as will be described later. A condensing device 40 is composed of the objective lens drive unit 4, the objective lens 5 and the reflecting mirror 6. Numeral 7 designates a base for supporting the disk motor 2 and the optical base 3, etc.; 9, a light beam emitted from the light beam emitting device 50 as will be described later; 9a, an optical axis representing the center of the light beam 9; 20, a micro beam spot condensed by the objective lens 5 onto a data recording surface of the disk 1; 11, a semiconductor laser; 12, a collimator lens converting the light beam emitted from the semiconductor laser 11 into a parallel beam; and 13, a half prism. A light beam emitting device 50 is composed of the semiconductor laser 11, the collimator lens 12 and the half prism 13. Likewise, reference numeral 14 designates a semiconductor laser supporting base; 15, a cover; 16, a polarizing beam splitter; 17, a Foucault prism; 18 and 19, condensing lenses; 20, a split-light detector for detecting tracking errors; 21a and 21b, a split-light detector for detecting focusing errors; and 24, a λ/2 plate.

The principle operation of the conventional optical head will be described hereinbelow. As shown in FIG. 8, a light emitted from the semiconductor laser 11 is converted into a parallel beam by the collimator lens 12, and the parallel beam subsequently passes through the half prism 13 and is emitted from the light beam emitting device 50 as the light beam 9. Meanwhile, as shown in FIG. 7, the objective lens drive unit 4 is supported traversably in a radial direction (a direction of B) of the disk 1 by means of the slide bearing or the like (not shown) and is drive in the radial direction (direction B) by a linear motor (not shown), etc. The emitted light beam 9 is directed to the objective lens 5 by means of the reflecting mirror 6 mounted at one end of the objective lens drive unit 4 and is then focused into the micro beam spot 10 of about 1 to 2-micrometer diameter upon the data recording surface of the disk 1. Not fully described in the specification, the objective lens drive unit 4 corrects focusing errors and tracking errors relative to the data recording surface of the disk 1 by driving the objective lens 5 in the direction of the optical axis and in the radial direction (a direction of B) orthogonal to the surface of the disk 1.

The light beam reflected from the disk surface 1 is further reflected by the half-prism 13 by way of the objective lens 5 and the reflecting mirror 6 as illustrated in FIG. 9, and is separated into two directions by means of the polarizing beam splitter 16. The light beam 22 of the two-split light beams that is transmitted through the polarizing splitter 16 is converged onto the photodetector 20 by the condensing lens 19. The photo detector 20 converts the incident light beam into electric signals, and a tracking error is detected from a differential output of the signals. On the other hand, the light beam reflected by the polarizing beam splitter 16 is further divided into a light beam 23a and a light beam 23b by means of the Foucault prism 17, and also converged by the condensing lens 18 to be incident on the photo detectors 21a and 21b which are used for detecting focusing errors and disposed at the image forming point. The focusing error is detected from each differential output. The foregoing objective lens drive unit 4 drives the objective lens 5 in the direction of the optical axis and in the radial direction in response to the quantity of tracking errors and focusing errors to correct the focusing error and the tracking error. Here, data can be obtained from the disk 1 by adding signals output from the photo detector 20 and the photo detectors 21a and 21b.

In this conventional optical head, the height of the optical disk apparatus is dependent on the height of the optical head (H in FIG. 7). Specifically, the height of the optical head H is the sum of the height h1 between the surface of the disk (1) and the center of the reflecting mirror 6, or the height between the upper surface of the disk 1 and the center of the optical axis of the light beam 9 emitted from the light beam emitting device 50, the height h2 including the height between the center of the optical axis 9a of the light beam 9 and a center of the height of optical parts such as a collimator lens 12, or the bottom thickness of the optical base 3 or the like, and the height h3 of the thickness of the base 7.

With conventional optical head apparatus having thus mentioned structure, it is necessary to secure a space for depositing a non-illustrated objective lens holder or a drive circuit in the height h1 between the upper surface of the disk and the center of the reflecting mirror 6 in designing the objective lens drive device 4. Hence, there was a limit for reducing the size of the apparatus. Moreover, the height h2 is chiefly decided by the dimension of the parts used in the light beam emitting device (50), and therefore it was difficult to reduce the space of the height h2. In addition, the height h3 of the base also has a limit for reducing its dimension in view of ensuring a sufficient unit strength.

SUMMARY OF THE INVENTION

This invention is aimed to overcome the above-described drawbacks of the prior art devices, and the object of the invention is to provide a compact optical disk apparatus in which the height of the optical head can be reduced.

To this aim, in accordance with one aspect of the present invention, there is provided an optical head comprising: a light beam emitting means for emitting a light beam along a first optical path; a condensing means for condensing a light onto a recording medium;

and an optical axis shifter for shifting the optical axis of the light beam from the first optical axis to a second optical axis parallel to the first optical axis and spaced away from the second optical axis at a given height, said optical axis shifter being positioned between the light beam emitting means and the condensing means.

As the optical axis shifter a prism is used having two reflecting faces lying in parallel and set apart from each other at a given distance. The light beam emitted from the light beam emitting means is reflected by the two reflecting faces, and the first optical axis of the beam is shifted to the second optical axis.

Therefore, the second optical axis is rather positioned to a base side relative to the first optical axis, and the height H of the optical head is reduced as well as the height h1 of FIG. 7 is decreased.

The invention, however, both as to its organization and operation, together with further objects and advantages thereof may best be appreciated by reference to the following detailed description taken in conjunction with the accompanying drawings.

DETAILED DESCRIPTION OF THE PREFERRED EMBODIMENTS

An optical head in accordance with a first embodiment of the present invention will be described hereunder with reference to the accompanying drawings.

Figure 1:
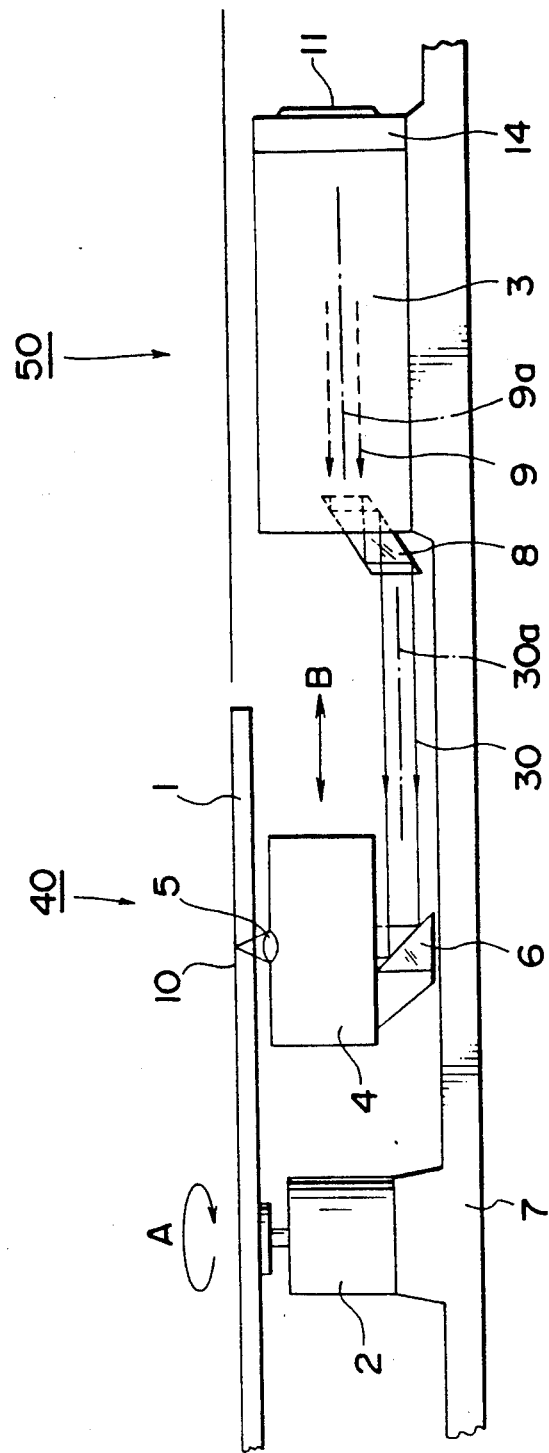
FIG. 1 is a side elevation view showing an optical head in accordance with a first embodiment of the present invention.
Figure 2:
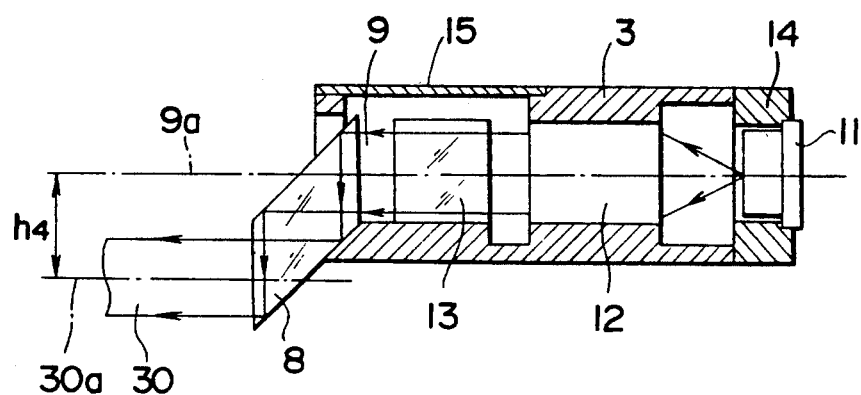
FIG. 2 is an explanatory view illustrating an optical converter.
Figure 3:
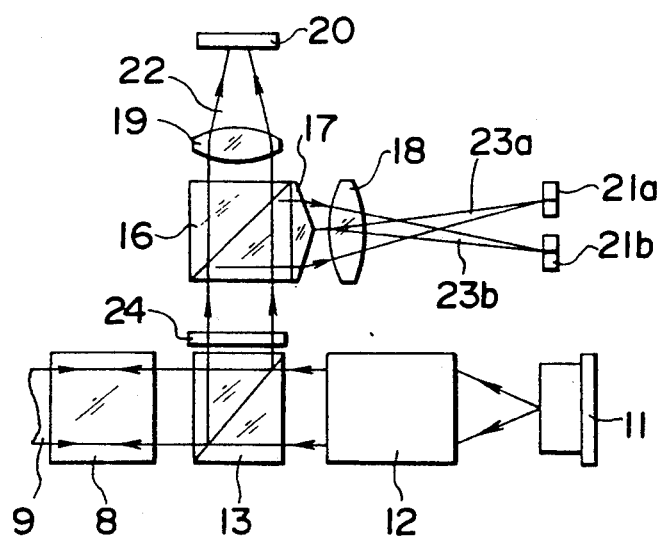
FIG. 3 is a layout drawing showing optical components of a light beam emitting device.
Figure 4A:
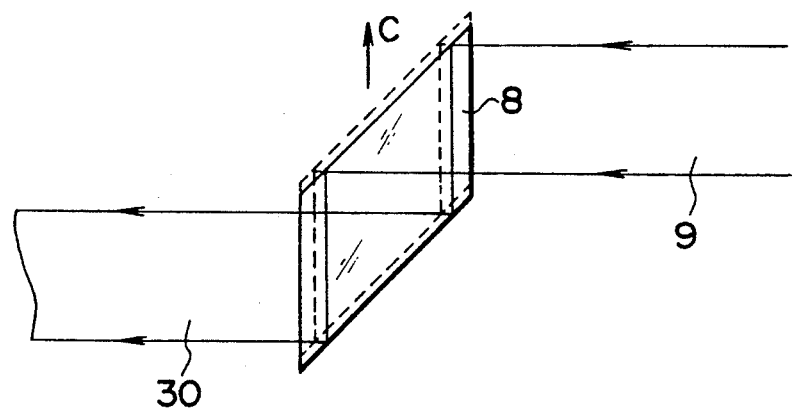
FIG. 4A, 4B and 4C show a diagram of principles illustrating a relationship between a locational displacement of an optical axis converting prism and a displacement of the optical axis.
Figure 4B:
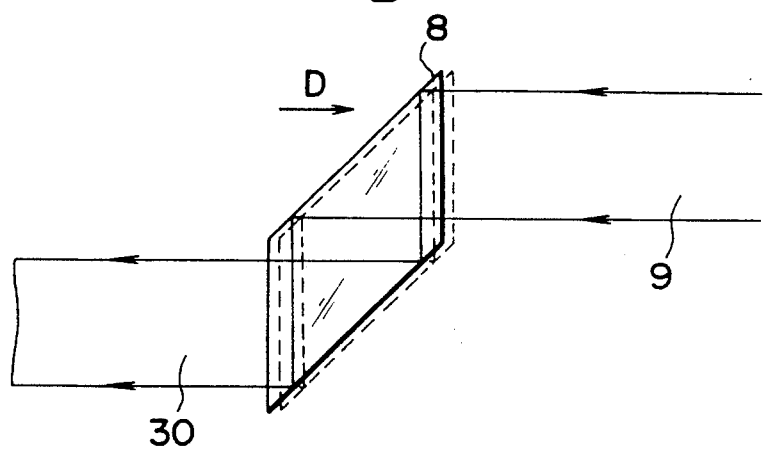
Figure 4C:
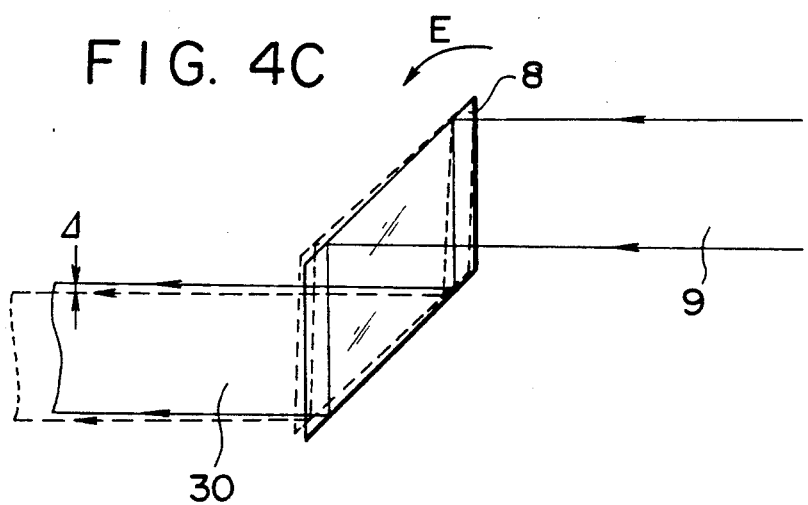

FIG. 1 is a view showing the structure of an optical head of an optical disk apparatus in accordance with one embodiment of the present invention;

FIG. 2 is a sectional side elevation view showing a light beam emitting device;

FIG. 3 is a layout drawing showing optical components of a light beam emitting means; and FIG. 4 is a diagram of principle illustrating a deviation of the light path because of a locational displacement of an optical axis converting prism.

In the drawings, reference number 1 designates a disk as a recording medium; 2, a disk drive motor; 3, an optical base; 4, an objective lens drive device; 5, an objective lens; 6, a reflecting mirror mounted on a part of the objective lens drive device 4 and for guiding a second light beam 30 the optical axis of which is shifted by an optical axis shifting prism 8, as will be described later, to the objective lens 5; and a condensing device 40 is composed of the combinations of the objective lens drive device 4, the objective lens 5 and the reflecting mirror 6.

Further, reference numeral 7 designates a base for holding the disk motor 2 and the optical base 3, or the like; 8, an optical axis shifting prism for shifting a beam from one optical axis to another; 9, a first light beam emitted from a light beam emitting device, as will be later described; 9a, a first optical axis representing the center of the first light beam 9; 10, a micro beam spot converged onto a data recording surface of the disk 1 through the objective lens 5; 11, a semiconductor laser; 12, a collimator lens for converting an irradiated light from the semiconductor laser 11 into a parallel beam; and 13, a half prism. A light beam emitting device 50 is made up of the semiconductor laser 11, the collimator lens 12 and the half prism 13.

Besides, reference numeral 14 designates a base for holding the semiconductor laser; 15, a cover; 16, a polarizing beam splitter; 17, Foucault prism; 18, 19, condensing lenses; 20, a split-light detector for detecting tracing errors; and (24), a λ/2 plate.

Furthermore, 30 designates a second light beam shifted from the position of the first light beam by the optical axis converting prism 8; and 30a, a second optical axis representing the center of the second light beam.

The principle operation of the optical head in accordance with the first embodiment of the present invention will now be explained.

As shown in FIGS. 1 through 3, a light emitted from the semiconductor laser 11 is converted into a parallel beam by the collimator lens 12, that is, a first light beam 9 to be emitted from the light beam emitting device 40 after having passed through the half prism 13. This first light beam is introduced to the optical axis shifting prism 8 having two reflecting faces lying in parallel. The first light is then shifted to the second light beam 30 having the second optical axis 30a which has an additional height h4 with respect to the first optical axis 9a. The optical axis shifting prism 8 is disposed in such a way that the additional height h4 is created at right angle relative to the surface of the recording medium 1 and downwardly of the same; namely, is produced on the base side 1. Consequently, in accordance with the optical head of the first embodiment, the height H of the optical head is reduced by the additional height h4 as compared with the height of the conventional optical head. In addition, the height h4 of the optical axis obtained by this invention can be changed freely by means of the optical axis shifting prism 8. The second light beam 30 whose optical axis has been shifted is further introduced to the objective lens 5 by the reflecting mirror 6 mounted on a part of the objective lens drive device 4 and then focused into a beam spot of about 1 to 2-micrometer diameter on the data recording surface of the disk 1. FIG. 4A and 4B shows a locational displacement of the optical path of an outgoing light with respect to the optical axis of the light incident on the prism. As shown in FIGS. 4A and 4B, in the case of the locational displacements in a parallel direction such as upward and downward (a direction of C), rightward and leftward (a direction of D) of the optical path shifting prism 8 and in a direction perpendicular to the plane of the drawing, no optical axis displacement occurs. However, the locational displacement in a rotatory direction (a direction of E) causes almost displacements of the optical axis. In general, such a quantity of the locational displacement Δ is determined by a rotatory displacement angle Δθ and a refractive index n, and if an ordinary optical material having a refractive index of about n=1.5 is used for the prism and the rotatory displacement of Δθ=10 mrad occurs, there occurs a slight displacement of the optical axis of a 30-micrometer or so. Also, this locational displacement is a parallel displacement. Such a displacement may affect the intensity distribution of the light spot on the split-light detector 20 for detecting tracing errors of FIG. 3, but the amount of such locational displacement might be said sufficiently small to be ignored in view of the quantity of degradation due to thermal variations and aged deterioration. This is because the use of the optical axis converting prism 8 simply causes a parallel locational displacement to occur.

Thus mentioned above, in accordance with this invention, since the optical axis shifting prism that shifts the first optical axis to the second optical axis in parallel with the first optical axis and set apart from the first optical axis at a given distance, it becomes possible to alter a position of the optical axis of the light beam emitted from the light beam emitting device freely; moreover, it becomes possible to reduce the size of the optical head sharply.

In accordance with this invention, the optical axis shifting prism 8 has been disposed on the side of the light beam emitting device 50 in this first embodiment. Alternatively, the optical axis shifting prism 8 may be positioned on the side of the condensing device 40 which is movable relative to the light beam emitting device 50 as shown in FIGS. 5 and 6, and the similar result can be obtained.

Figure 5:
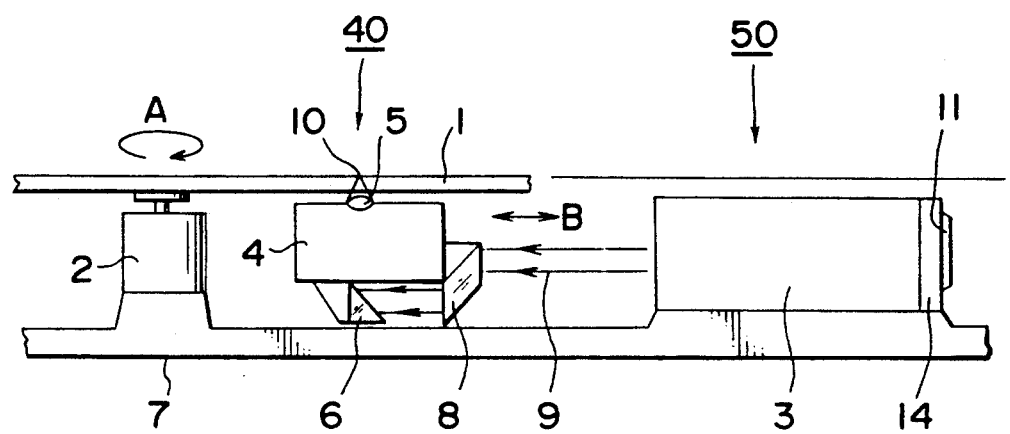
FIG. 5 is a side elevation view showing a second embodiment of this invention.
Figure 6:
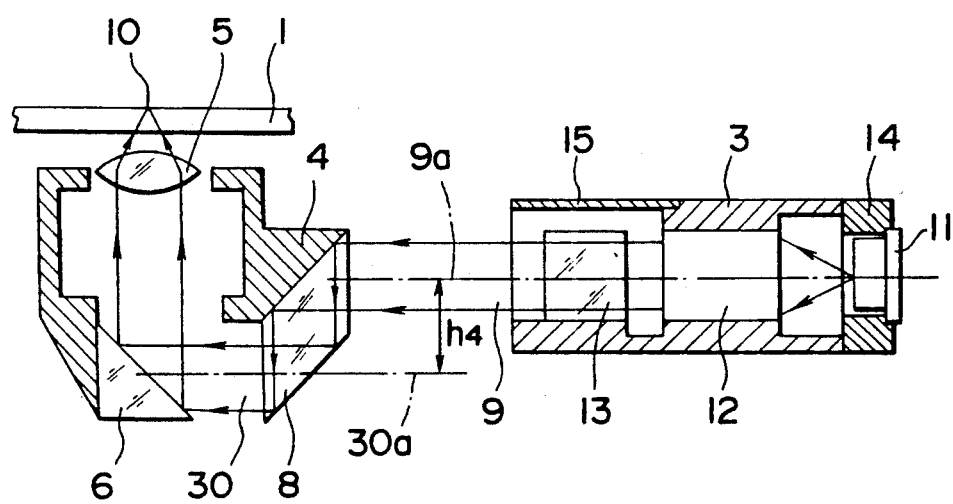
FIG. 6 is an explanatory view illustrating an optical axis conversion realized in the second embodiment of FIG. 5.
Figure 7:
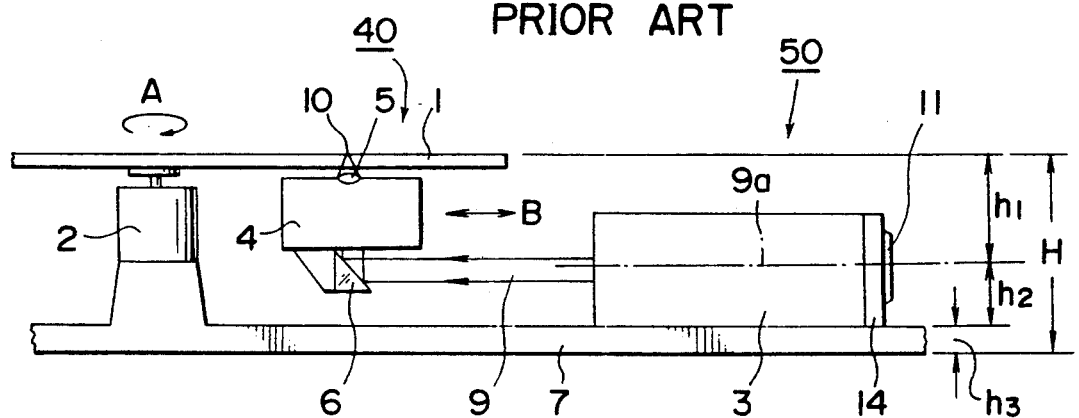
FIG. 7 is a side elevation view showing a conventional optical head.
Figure 8:
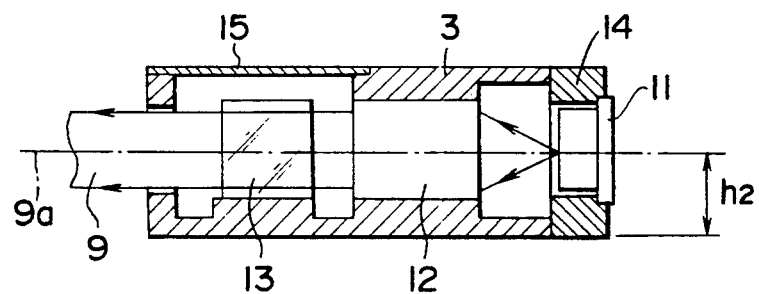
FIG. 8 is a sectional side elevation view showing a light beam emitting device of the conventional optical head.
Figure 9:
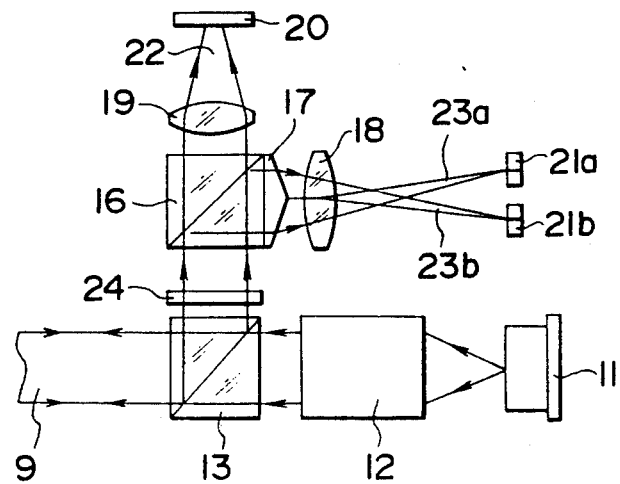
FIG. 9 is a layout drawing showing optical parts of the light beam emitting device.

In FIGS. 5 and 6, reference numeral 8 designates an optical axis shifting prism attached to the front of the reflecting mirror which constitutes a light condensing device 40; 9, a first optical axis representing the center of the first light beam 9; 30, a second light beam which is obtained by shifting the optical axis of the first light beam 9; 30a, a second light axis representing the center of the second light beam 30; and h4, a height of the level difference between the first optical axis 9a and the second optical axis 30a.

Furthermore, it will be easily appreciated that the similar result can be obtained even if the light condensing device 40 and the light beam emitting device 50 are included in one unit.

While this invention has been described with reference to illustrative embodiments, this description is not intended to be construed in a limiting sense. Various modifications of the illustrative embodiments, as well as other embodiments of the invention, will be apparent to persons versed in the art upon reference to this description. It is, therefore, contemplated that the appended claims will cover any such modifications or embodiments as fall within the true scope of the invention.

What is claimed is:

1. An optical head for optically recording, reproducing, or erasing data by condensing an irradiated light beam onto a recording medium and by forming minute optical spots thereon, said optical head comprising:
    (a) light emitting means for emitting the light beam along a first optical axis, parallel to the recording medium;
    (b) light condensing means for condensing the light beam onto the recording medium so as to form minute optical spots on the recording medium;
    (c) optical axis shifting means including a first reflective surface for reflecting the light beam traveling along the first optical axis in a direction away from the recording medium and a second reflective surface for reflecting the light beam reflected by the first reflective surface so as to form a second optical axis parallel to said first optical axis; and
    (d) a light reflecting means for reflecting the light beam forming the second optical axis in a perpendicular direction toward the recording medium;
    wherein the optical axis shifting means and the light reflecting means are disposed in the optical path between the light emitting means and the light condensing means.

2. The optical head of claim 1, wherein said optical axis shifting means comprises a prism having two reflecting faces lying in parallel and spaced apart from each other at a predetermined distance and shifts said first optical axis to said second optical axis by reflecting said light beam emitted from said light beam emitting means by means of said two reflecting faces.

3. The optical head of claim 2, wherein the light beam emitting means includes alight source for producing the light beam and a collimator lens for converting the produced light beam into a parallel light beam to be emitted along the first optical axis.

4. The optical head of claim 3, wherein the light source further includes alight separating device for separating the parallel light beam by passing a portion of said parallel light beam from said collimator lens as emitted light to said optical axis shifting means and by deflecting a portion of said parallel light beam for subsequent use for tracing control within said light beam emitting means.

5. The optical head of claim 4, wherein the light separating device is a half prism.

6. The optical head of claim 3, wherein the optical axis shifting means is connected to a light beam emitting end of the light beam emitting means.

7. The optical head of claim 3, wherein the optical axis shifting means is connected to the light condensing means.

8. An optical head for optically recording, reproducing or erasing data by condensing an irradiated light beam onto a recording medium, and by forming minute optical spots thereon, said optical head comprising:
    a light emitting device for emitting the light beam along a first optical axis which is parallel to a surface of the recording medium;
    a light condenser for condensing the light beam onto the recording medium so as to form minute optical spots on the recording medium;
    an optical axis shifter, including a first reflective surface for reflecting the light beam traveling along the first optical axis in a direction away from the recording medium and a second reflective surface for reflecting the light beam reflected by the first reflective surface so as to form a second optical axis parallel to the first optical axis; and
    a light reflector for reflecting the light beam forming the second optical axis in a perpendicular direction toward the recording medium;
    wherein the optical axis shifter and the light reflector are disposed in the optical path between the light emitting device and the light condenser.

9. The optical head of claim 8, wherein said optical axis shifter is a prism with two reflecting faces.

10. The optical head of claim 9, wherein the light emitting device includes a light source for producing the light beam and a collimator lens for converting the produced light beam into a parallel light beam to be emitted along the first optical axis.

11. The optical head of claim 10, wherein the light source further includes a light separating device for passing a portion of said parallel light beam from said collimator lens as emitted light to said optical axis shifter and for deflecting a portion of said parallel light beam for subsequent use for tracking control within said light emitting device.

12. The optical head of claim 11, wherein the light separating device is a half prism.

13. The optical head of claim 8, wherein the optical axis shifter is connected to alight beam emitting end of the light emitting device.

14. The optical head of claim 8, wherein the optical axis shifter is connected to the condensing device.

* * * * *